(12) United States Patent
Clerici et al.

(10) Patent No.: US 7,144,924 B2
(45) Date of Patent: *Dec. 5, 2006

(54) PROCESS FOR THE PRODUCTION IN CONTINUOUS OF HYDROCARBONS FROM SYNTHESIS GAS IN SLURRY REACTORS AND FOR THE SEPARATION OF THE LIQUID PHASE PRODUCED FROM THE SOLID PHASE

(75) Inventors: Gabriele Carlo Ettore Clerici, Milan (IT); Giuseppe Belmonte, Turin (IT)

(73) Assignees: ENI S.p.A., Rome (IT); Institut Francais du Petrole, Rueil-Malmaison (FR); Enitechnologie S.p.A., San Donato Milanese (IT)

( * ) Notice: Subject to any disclaimer, the term of this patent is extended or adjusted under 35 U.S.C. 154(b) by 203 days.

This patent is subject to a terminal disclaimer.

(21) Appl. No.: 10/870,049

(22) Filed: Jun. 18, 2004

(65) Prior Publication Data

US 2005/0004238 A1   Jan. 6, 2005

(30) Foreign Application Priority Data

Jun. 28, 2003   (IT)   .......................... MI2003A1288

(51) Int. Cl.
*C07C 27/00*   (2006.01)
(52) U.S. Cl. ........................ 518/715; 518/705; 518/700
(58) Field of Classification Search ................ 518/700, 518/705, 715
See application file for complete search history.

(56) References Cited

U.S. PATENT DOCUMENTS

| 5,527,473 A | 6/1996 | Ackerman |
| 6,156,809 A | 12/2000 | Clark et al. |
| 2004/0266894 A1* | 12/2004 | Belmonte et al. ........... 518/726 |
| 2005/0000861 A1* | 1/2005 | Clerici et al. ........... 208/251 R |

FOREIGN PATENT DOCUMENTS

| DE | 3245318 A1 | 6/1984 |
| EP | 0 412 785 A1 | 2/1991 |
| JP | 11-10151 | 1/1999 |
| WO | WO 94/11309 | 5/1994 |
| WO | WO 01/36068 A1 | 5/2001 |
| WO | WO 03/004582 A2 | 1/2003 |

* cited by examiner

*Primary Examiner*—J. Parsa
(74) *Attorney, Agent, or Firm*—Oblon, Spivak, McClelland, Maier & Neustadt, P.C.

(57) ABSTRACT

Hydrocarbons are prepared, liquid at the reaction temperature, by feeding synthesis gas into three-phase turbulent reactors in which the solid phase, consisting of the catalyst in the form of particles, is kept in suspension in the liquid phase by the rising synthesis gas. The reaction product is separated/filtered in continuous from the catalyst dispersed therein by means of at least one filtration device consisting of a hydrocyclone over which there is a first hollow metal element in which a second hollow element is situated, coaxial with the first, made of a material having a porous structure, with an average pore diameter ranging from 0.002 to 0.1 micrometers, suitable for micro/ultrafiltration.

19 Claims, 2 Drawing Sheets

PROCESS FOR THE PRODUCTION IN CONTINUOUS OF HYDROCARBONS FROM SYNTHESIS GAS IN SLURRY REACTORS AND FOR THE SEPARATION OF THE LIQUID PHASE PRODUCED FROM THE SOLID PHASE

The present invention relates to a process for the production in continuous of hydrocarbons starting from synthesis gas in slurry reactors and for the separation of the liquid phase produced from the solid phase.

More specifically, the present invention relates to a process for the production in continuous of hydrocarbons starting from gaseous mixtures based on CO and $H_2$, by means of the Fischer-Tropsch technology in slurry reactors, and for the separation of the hydrocarbon phase, liquid at the reaction temperature, from the solid phase dispersed therein.

Even more specifically, the present invention also relates to the filtrating device used in the separation of the suspension.

The Fischer-Tropsch technology is known in literature, for preparing hydrocarbons from mixtures of gas based on hydrogen and carbon monoxide, conventionally known as synthesis gas. A compendium which summarizes the main works on the Fischer-Tropsch synthesis reaction is contained in the Bureau of Mines Bulletin, 544, (1955) entitled "Bibliography of the Fischer-Tropsch Synthesis and Related Processes" H. C. Anderson, J. L. Wiley and A. Newell.

The Fischer-Tropsch technology is generally based on the use of slurry reactors, reactors which are normally used in relation to chemical reactions which are carried out in three-phase systems in which a gaseous phase is bubbled into a suspension of a solid in a liquid. The gaseous phase consists of synthesis gas, with a molar ratio $H_2$/CO ranging from 1 to 3, the dispersing liquid phase, at a high temperature, represents the reaction product, i.e. mainly linear hydrocarbons with a high number of carbon atoms, and the solid phase is represented by the catalyst.

The reaction product which is discharged from the reactor therefore consists of a suspension containing particles, that can also be fine, which must be treated to separate the solid (catalyst) from the liquid phase. Whereas the catalyst is recycled to the synthesis reactor, the liquid is subjected to subsequent upgrading treatment, for example hydrocracking and/or hydro-isomerization treatment, to obtain hydrocarbon fractions of industrial interest.

European patent 609,079 describes a reactor for Fischer-Tropsch reactions consisting of a gas-bubbling tower containing a suspension consisting of particles of catalyst suspended in the liquid hydrocarbon. The synthesis gas is fed to the base of the reactor whereas the synthesized hydrocarbon is recovered at the head.

In order to avoid the entrainment of catalyst particles, the reactor is equipped with cylindrical filtration devices internally arranged in its upper part.

International patent application WO 97/31693 describes a method for separating a liquid from a suspension of solid particles which comprises, in a first phase, degasifying the suspension and, in a second phase, filtering the suspension through a tangential flow. In particular, the suspension comes from a Fischer-Tropsch reactor and consists of synthesized heavy hydrocarbons which entrain the catalyst particles.

Other examples of methods for separating the catalyst contained in the suspension leaving a Fischer-Tropsch reactor are described in European patent 592,176, international patent application WO 94/16807, English patent 2,281,224, U.S. Pat. Nos. 4,605,678 and 5,324,335 and German patent 3,245,318.

A disadvantage associated with Fischer-Tropsch processes, for example with those mentioned above, and in particular Fischer-Tropsch processes in which the catalyst is based on cobalt, is that a liquid hydrocarbon is produced, which, in the subsequent transformation phases (hydro-isomerization and/or hydrocracking), causes an alteration in the performances of the corresponding catalysts.

The Applicants have surprisingly found a Fischer-Tropsch process for the production in continuous of hydrocarbons, using slurry reactors, which allows a reaction product to be obtained, consisting of paraffinic waxes which can then be processed in subsequent upgrading treatment, such as hydro-isomerization and/or hydrocracking processes, without coming up against the drawbacks of the known art, i.e. without causing an alteration in the performances of the corresponding catalysts.

An object of the present invention therefore relates to a process for the production in continuous of hydrocarbons from synthesis gas in slurry reactors which comprises:

a. continuously feeding to the bottom of a reactor for Fischer-Tropsch reactions, containing in suspension in the reaction product, a catalyst based on supported cobalt, a synthesis gas essentially consisting of hydrogen and carbon monoxide in molar ratios $H_2$/CO ranging from 1 to 3;

b. continuously discharging from the head of the reactor, a stream essentially consisting of light synthesis products in vapour phase, and non-reacted reaction gas;

c. continuously discharging from the reactor, the heavy reaction product essentially consisting of a liquid hydrocarbon phase;

d. subjecting the heavy reaction product, before or after discharging, to a separation/filtration treatment using at least one filtration device consisting of a hydrocyclone over which there is a first hollow metal element, preferably cylindrical, in which a second hollow element, preferably cylindrical, is situated, coaxial with the first, made of a material having a porous structure, with an average pore diameter ranging from 0.002 to 0.1 µm, suitable for micro/ultrafiltration;

e. sending the filtered heavy reaction product, in liquid phase, having a content of fine or submicronic particles lower than 5 ppm, to a subsequent treatment unit, for example hydrocracking and/or hydro-isomerization, or discharging it and cooling it to room temperature;

f. recycling the solids coming from the separation/filtration step to the reaction reactor.

According to the process object of the present invention, the reactor for Fischer-Tropsch reactions is a bubble reactor consisting of a vessel, generally vertical, for example a tower, inside which chemical reactions are triggered, which take place in three-phase systems in which a gaseous/vapour phase is bubbled into a suspension of a solid in a liquid. In the present case, the gaseous/vapour phase essentially consists of the synthesis gas and light reaction products in vapour phase, the dispersing liquid phase is the heavy reaction product or linear hydrocarbons, essentially with a high number of carbon atoms, and the solid phase is represented by the catalyst.

The synthesis gas preferably comes from the steam reforming and/or partial oxidation of natural gas or other hydrocarbons, on the basis of the reactions described, for example, in U.S. Pat. No. 5,645,613. Alternatively, the synthesis gas can come from other production techniques such as, for example, autothermal reforming, C.P.O. (Catalytic Partial Oxidation) or the gasification of carbon with high temperature water vapour as described in "Catalysis Science and Technology", Vol. 1, Springer-Verlag, New York, 1981.

Two phases are substantially produced from the Fischer-Tropsch reaction, a lighter phase, in vapour phase, essentially consisting of a mixture of light hydrocarbons, with from 1 to 25 carbon atoms and a boiling point at atmospheric pressure, for the $C_5$–$C_{25}$ fraction, equal to or lower than about 150° C. and reaction by-products, such as water vapour, ethers or alcohols.

This stream, together with the non-reacted reaction gas, is cooled in order to condense and separate the light hydrocarbons from the water generated by the reaction and from the other by-products. At least part of these liquid hydrocarbon products, essentially consisting of mixtures of $C_5$–$C_{25}$ hydrocarbons, is accumulated in a collection tank maintained at a pressure higher than that present in the synthesis reactor and at a temperature higher than 150° C. This product can be used within the production cycle as process liquid, for example for washing the filtering devices at the end of their filtering cycle, or it can be partially discharged and used as diluent in the subsequent hydro-isomerization and/or hydrocracking operations.

The second phase produced essentially consists of paraffinic waxes, liquid at the reaction temperature, comprising mixtures of saturated linear hydrocarbons, with a high number of carbon atoms. These are generally hydrocarbon mixtures which have a boiling point, at room pressure, higher than 150° C., for example from 160 to 380° C.

The Fischer-Tropsch reaction is carried out at temperatures equal to or higher than 150° C., for example ranging from 200 to 350° C., maintaining a pressure ranging from 0.5 to 20 MPa, inside the reactor. More significant details on Fischer-Tropsch reactions are available in "Catalysis Science and Technology" mentioned above.

The heavier liquid phase contains the catalyst in suspension. Any catalyst based on cobalt capable of being active in Fischer-Tropsch reactions can be used in the process, object of the present invention. The preferred catalyst, according to the present invention, is based on Co dispersed on a solid carrier consisting of at least one oxide selected from one or more of the following elements: Si, Ti, Al, Zr, Mg. Preferred carriers are silica, alumina or titania.

The cobalt is present in the catalyst in quantities ranging from 1 to 50% by weight, generally from 5 to 35%, with respect to the total weight.

The catalyst used in the process, object of the present invention, can comprise other additional elements. For example, it can comprise, with respect to the total, from 0.05 to 5% by weight, preferably from 0.1 to 3%, of ruthenium and from 0.05 to 5% by weight, preferably from 0.1 to 3%, of at least a third element selected from those belonging to group 3 (IUPAC regulation). Catalysts of this type are known in literature and described, together with their preparation, in European patent 756,895.

Further examples of catalysts are still based on cobalt but containing, as promoting element, tantalum in quantities of 0.05–5% by weight, with respect to the total, preferably 0.1–3%. These catalysts are prepared by first depositing a cobalt salt on the inert carrier (silica or alumina), for example by means of the dry impregnation technique, followed by a calcination step and, optionally, a reduction and passivation step of the calcined product.

A derivative of tantalum (particularly tantalum alcoholates) is deposited on the catalytic precursor thus obtained, preferably with the wet impregnation technique, followed by calcination and, optionally, reduction and passivation.

The catalyst, whatever its chemical composition may be, is used in the form of a finely subdivided powder with an average diameter of the granules ranging from 10 to 700 μm.

The suspension discharged from the reactor is sent to a separation unit of the solid from the liquid which can also comprise a degasification apparatus. More specifically, the filtration device, forming the separation/filtration unit, can be inserted inside the synthesis reactor, for example in correspondence with the lateral discharge, or outside the reactor. In the latter case, the separation/filtration unit can also comprise a degasification apparatus outside the reactor.

The possible degasification apparatus essentially consists of a vertical vessel in which the suspension remains for a time ranging from 1 to 5 minutes, during which entrained gas and vapours are released above the free surface of the suspension.

Following the possible degasification step, the suspension is treated through the filtration device. This comprises a hydrocyclone, for a primary separation, which produces a concentrated product at the bottom (underflow), recycled to the reactor, and a product at the head (overflow) which still contains a residual fraction of catalyst and possible significant traces of fine or submicronic catalytic particles. This second flow passes through the annular space between the first metal cylinder, which is above the hydrocyclone, and the cylinder made of porous material situated inside the first cylinder, undergoing micro/ultrafiltration treatment. The filtrated fluid can be discharged through a specific canalization whereas the concentrated fluid in the form of fine or submicronic particles can be recycled to the synthesis reactor.

For specific application, for example at a temperature ranging from 210 to 240° C. and at a pressure ranging from 5 to 30 bar, conventional hydrocyclones can be used and, as internal cylindrical elements suitable for micro/ultrafiltration, cylindrical surfaces made of sintered steel or of ceramic materials with multiple channels, for example in alumina or zirconia or titania, available on the market as Membralox® or Schumasiv® produced by Pall Corporation. Information on micro/ultrafiltration is available in W. S. Winston Ho, K. K. Sirkar "Membrane Handbook", Chapman & Hall, 28, 408, 1992 and D. Paulson, "Membranes, the Finest Filtration", Filtration News, 1995.

Downstream of the separation/filtration step, the hydrocarbon liquid phase, substantially free of solid particles which can negatively influence the subsequent transformation phases, can be cooled to room temperature and stored in solid phase, or it can be sent to a transformation unit (hydrocracking and/or hydro-isomerization).

The separation/filtration units are periodically washed in countercurrent, at the end of their filtering cycle, with a stream of light synthesis hydrocarbons removed from the corresponding collection tank.

The process for the continuous production of hydrocarbons from synthesis gas, object of the present invention, can be better understood by referring to the drawings of the enclosed figures which represent illustrative but non-limiting embodiments and in which.

Figure 1:
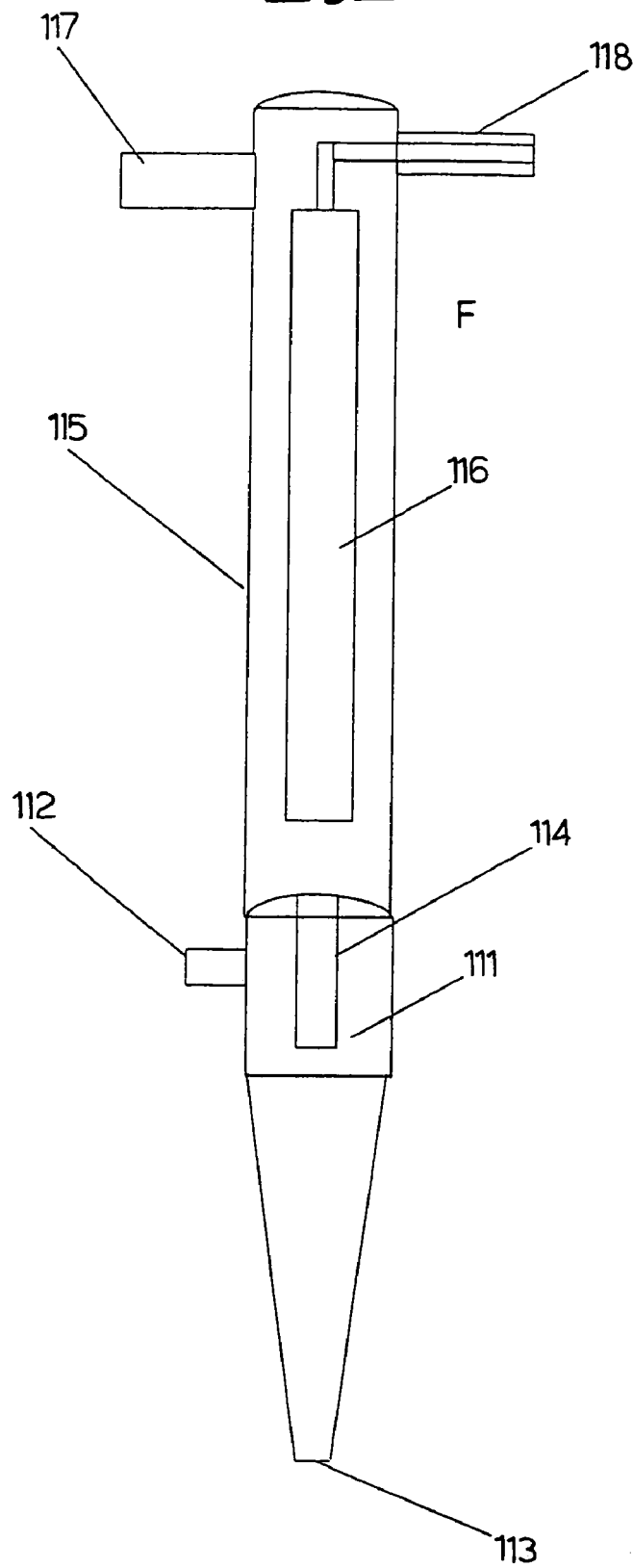
FIG. 1 represents a front view of the filtration device.

With reference to the figures, the filtration device F used in the process, object of the present invention, comprises a hydrocyclone (111) having an inlet (112) of the suspension and discharge outlets (113) and (114) respectively for the solution concentrated in solids (underflow) and for the diluted stream (overflow). A hollow cylindrical metal element (115) is positioned above the hydrocyclone, inside which there is the micro/ultrafiltration element (116). The cylindrical element has an outlet (117) for the liquid concentrated in fine or submicronic particles whereas the filtrating element (116) has a specific canalization (118) for the liquid filtrated according to specification.

Figure 2:
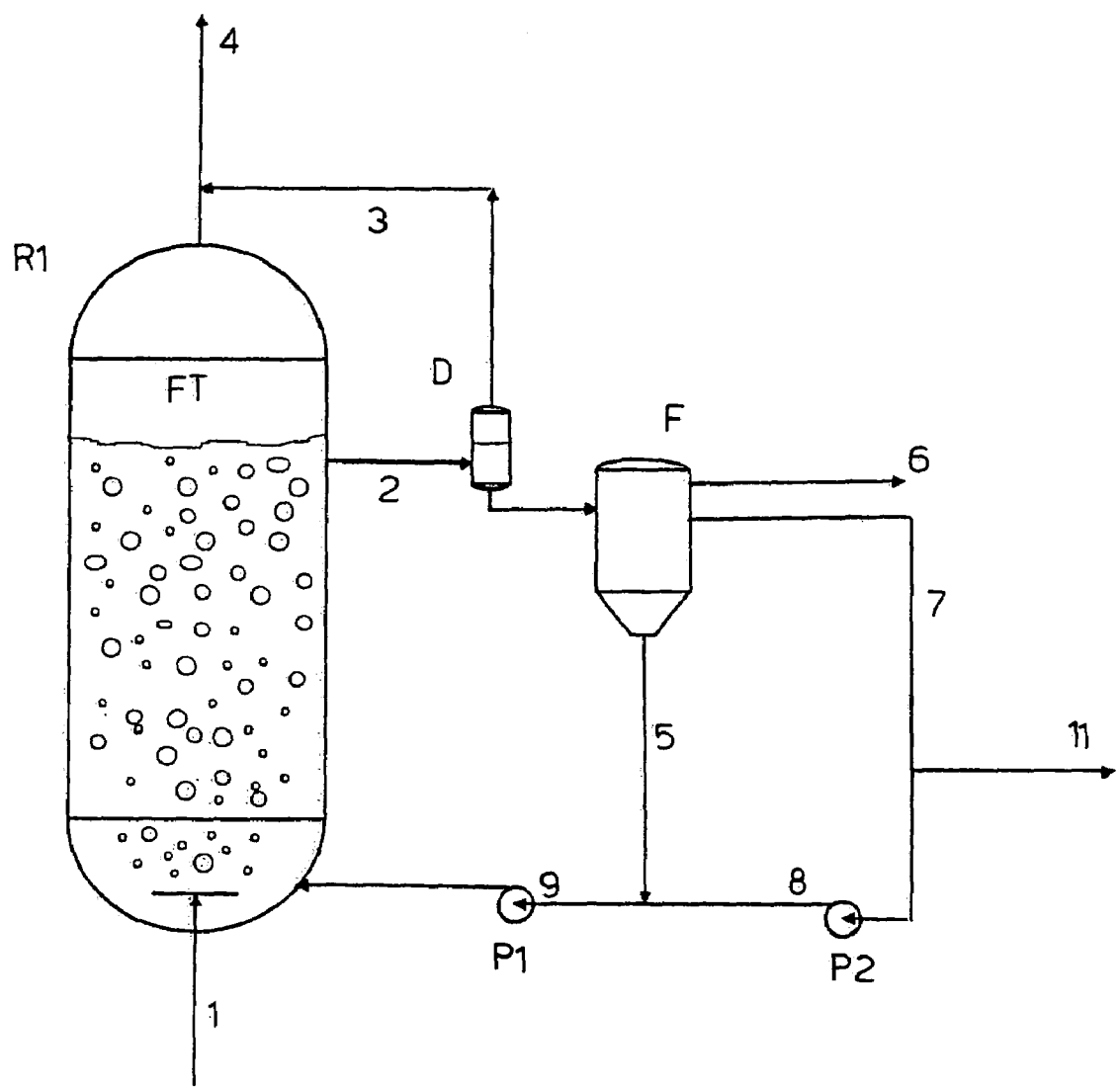
FIG. 2 represents a process scheme in which the filtration device is situated outside the reactor.

The process scheme which uses one or more filtrating devices of the present invention outside the reaction vessel (FIG. 2), comprises a reactor R1 to which the synthesis gas (1) is fed through line (1). Inside the reactor, there is a suspension consisting of the catalyst dispersed in the reaction liquid and maintained in a state of stirring by the bubbles of synthesis gas which, on rising upwards, meet the particles of catalyst, keep them in suspension and react. The operating conditions of the reactor can be those described, for example, in international patent application WO 03/2246 or French patent 2,826,294.

A gaseous stream essentially consisting of the non-reacted gas and light reaction products and by-products, is discharged from the head of the reactor, through line (4), which is fed to a cooling and condensation section of a light hydrocarbon fraction, not illustrated. The hydrocarbon suspension, the liquid product of the Fischer-Tropsch reaction, is discharged by means of line (2) and sent to the degasifier D where the entrained gases and vapours are released, above the free surface of the suspension, and are sent through line (3) to the cooling and condensation section, not illustrated.

The suspension is then sent to the separation unit in which at least one filtration device F is inserted. The stream filtrated according to specification (6) and the concentrate of the primary separation (5), recycled to the reactor R1 by means of the pump P1 and line (9), or by means of a natural external circulation, and that of the secondary filtration (7), recycled to the reactor R1 by means of the pump P2, and line (8), are respectively recovered from the vessel F. In order to limit the possible accumulation of fine submicronic particles in the reactor R1, it is possible to discharge part of the concentrated stream in fine or submicronic particles by means of a purge (11).

The invention claimed is:

1. A process for the continuous production of hydrocarbons from synthesis gas in a slurry reactors which comprises:
   a. continuously feeding to the bottom of a reactor for Fischer-Tropsch reactions, containing in suspension in the reaction product, a catalyst based on supported cobalt, and a synthesis gas comprising hydrogen and carbon monoxide;
   b. continuously discharging from a head of the reactor, a stream comprising light synthesis products in the vapour phase, and non-reacted reaction gas;
   c. continuously discharging from the reactor, a heavy reaction product comprising a liquid hydrocarbon phase;
   d. subjecting the heavy reaction product, before or after discharging, to a separation/filtration treatment using at least one filtration device consisting of a hydrocyclone over which there is a first hollow metal element, in which a second hollow element is situated, coaxial with the first, made of a material having a porous structure, with an average pore diameter ranging from 0.002 to 0.1 µm, suitable for micro/ultrafiltration to produce a filtered heavy reaction product;
   e. sending the filtered heavy reaction product, in liquid phase, having a content of fine or submicron particles lower than 5 ppm, to a subsequent treatment unit, or discharging it and cooling it to room temperature;
   f. recycling the solids coming from the separation/filtration step to the reactor.

2. The process according to claim 1, wherein the reactor for Fischer-Tropsch type reactions is a bubble reactor consisting of a vessel inside which chemical reactions are triggered, which take place in three-phase systems where a gaseous/vapour phase is bubbled into a suspension of a solid in a liquid.

3. The process according to claim 1 or 2, wherein the gaseous/vapour phase comprises the synthesis gas and light reaction products in the vapour phase, the liquid hydrocarbon phase consists of linear hydrocarbons, and the solids are represented by the catalyst.

4. The process according to claim 1, wherein the light synthesis products comprise hydrocarbon mixtures with a number of carbon atoms ranging from 1 to 25 and a boiling point, for the $C_5$–$C_{25}$ fraction, equal to or lower than about 150° C.

5. The process according to claim 1 or claim 2, wherein the heavy reaction product comprises paraffinic waxes, liquid at the reaction temperature, comprising mixtures of saturated, linear hydrocarbons, having a boiling point, at atmospheric pressure, higher than 150° C.

6. The process according to claim 1 or claim 2, wherein the reaction is carried out at temperatures equal to or higher than 150° C., a pressure ranging from 0.5 to 20 MPa being maintained inside the reactor.

7. The process according to claim 1 or claim 2, wherein the catalyst is based on cobalt dispersed on a solid carrier selected from at least one oxide of one or more of the following elements: Si, Ti, Al, Zr, Mg.

8. The process according to claim 7, wherein the cobalt is present in quantities ranging from 1 to 50% by weight with respect to the total weight.

9. The process according to claim 7, wherein the catalyst comprises, with respect to the total, from 0.05 to 5% by weight of ruthenium and from 0.05 to 5% by weight of at least a third element selected from those belonging to group 3.

10. The process according to claim 7, wherein the catalyst comprises, as promoting element, tantalum in quantities ranging from 0.05–5% by weight, with respect to the total.

11. The process according to claim 1 or claim 2, wherein the catalyst is in the form of a finely subdivided powder with an average diameter of the granules ranging from 10 to 700 µm.

12. The process according to claim 1 or claim 2, wherein the separation/filtration treatment takes place using a filtration device situated inside or outside the synthesis reactor.

13. The process according to claim 12, wherein the filtration device is situated outside the synthesis reactor.

14. The process according to claim 1 or claim 2, wherein the separation/filtration treatment further comprises at least one degasification step.

15. The process according to claim 14, wherein the degasification step is carried out in a vertical vessel in which the suspension remains for a time ranging from 1 to 5 minutes.

16. The process according to claim 1 or claim 2, wherein the separation/filtration treatment takes place at a temperature ranging from 210 to 240° C. and a pressure ranging from 5 to 30 bar.

17. The process according to claim 1 or claim 2, wherein the material having a porous structure forming the second cylinder of the filtration device is based on ceramic materials with multiple channels made of alumina, zirconia or titania or sintered steel.

18. The process according to claim 1 or claim 2, wherein the filtration device is periodically washed in countercurrent with a stream of light synthesis hydrocarbons.

19. The process for the continuous production of hydrocarbons from synthesis gas in a slurry reactor as claimed in claim 1, which comprises:
  a. continuously feeding to the bottom of a reactor for Fischer-Tropsch reactions, containing in suspension in the reaction product, a catalyst based on supported cobalt, and a synthesis gas consisting essentially of hydrogen and carbon monoxide;
  b. continuously discharging from a head of the reactor, a stream consisting essentially of light synthesis products in the vapour phase, and non-reacted reaction gas;
  c. continuously discharging from the reactor, a heavy reaction product consisting essentially of a liquid hydrocarbon phase;
  d. subjecting the heavy reaction product, before or after discharging, to a separation/filtration treatment using at least one filtration device consisting of a hydrocyclone over which there is a first hollow metal element, in which a second hollow element is situated, coaxial with the first, made of a material having a porous structure, with an average pore diameter ranging from 0.002 to 0.1 µm, suitable for micro/ultrafiltration to produce a filtered heavy reaction product;
  e. sending the filtered heavy reaction product, in liquid phase, having a content of submicron particles lower than 5 ppm, to a subsequent treatment unit, or discharging it and cooling it to room temperature;
  f. recycling the solids coming from the separation/filtration step to the reactor.

* * * * *

UNITED STATES PATENT AND TRADEMARK OFFICE
CERTIFICATE OF CORRECTION

PATENT NO. : 7,144,924 B2 Page 1 of 1
APPLICATION NO. : 10/870049
DATED : December 5, 2006
INVENTOR(S) : Clerici et al.

It is certified that error appears in the above-identified patent and that said Letters Patent is hereby corrected as shown below:

On the title page, Item (30), the Foreign Application Priority Data information is incorrect. Item (30) should read:

-- (30)     Foreign Application Priority Data

Jun. 25, 2003  (IT) ………………….. M12003A1288 --

Signed and Sealed this

Thirteenth Day of February, 2007

JON W. DUDAS
*Director of the United States Patent and Trademark Office*